United States Patent
Hanya et al.

(10) Patent No.: US 8,248,736 B2
(45) Date of Patent: Aug. 21, 2012

(54) DISK DRIVE SUSPENSION HAVING A MICROACTUATOR MOUNTING SECTION

(75) Inventors: Masao Hanya, Aiko-gun (JP); Toshiki Ando, Aiko-gun (JP); Ryoichi Tazawa, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 123 days.

(21) Appl. No.: 12/876,487

(22) Filed: Sep. 7, 2010

(65) Prior Publication Data

US 2011/0058280 A1    Mar. 10, 2011

(30) Foreign Application Priority Data

Sep. 8, 2009    (JP) ................................ 2009-207273

(51) Int. Cl.
     *G11B 5/58*      (2006.01)
     *G11B 21/24*      (2006.01)
(52) U.S. Cl. ................ 360/294.4; 360/244.8; 360/244.5
(58) Field of Classification Search ............... 360/294.3, 360/294.4, 244.5, 244.6, 264.5, 244.8; 310/330
See application file for complete search history.

(56) References Cited

U.S. PATENT DOCUMENTS

| | | | | |
|---|---|---|---|---|
| 6,233,124 B1 * | 5/2001 | Budde et al. | ................ | 360/294.4 |
| 6,331,923 B1 * | 12/2001 | Mei | ............... | 360/294.4 |
| 6,411,475 B1 * | 6/2002 | Khan et al. | ................ | 360/294.4 |
| 6,507,463 B1 * | 1/2003 | Boutaghou | ................ | 360/294.3 |
| 6,661,619 B2 * | 12/2003 | Nishida et al. | ............. | 360/294.4 |
| 6,731,472 B2 * | 5/2004 | Okamoto et al. | .......... | 360/294.3 |
| 7,038,888 B2 * | 5/2006 | Ma | .............. | 360/294.4 |
| 7,280,319 B1 * | 10/2007 | McNab | ..................... | 360/294.4 |
| 7,292,413 B1 * | 11/2007 | Coon | ......................... | 360/294.4 |
| 7,459,835 B1 * | 12/2008 | Mei et al. | ....................... | 310/330 |
| 2006/0227463 A1 * | 10/2006 | Wright et al. | ............. | 360/244.2 |

FOREIGN PATENT DOCUMENTS

| JP | 2001-307442 A | 11/2001 |
|---|---|---|
| JP | 2002-50140 A | 2/2002 |

* cited by examiner

*Primary Examiner* — Brian Miller
(74) *Attorney, Agent, or Firm* — Holtz, Holtz, Goodman & Chick, PC

(57) ABSTRACT

A microactuator mounting section is disposed between a base section and a load beam. A microactuator element formed of a piezoelectric element is contained in an element accommodation portion in a plate portion. The plate portion has a stationary part secured to the base section and a movable part secured to the load beam. The stationary part and the movable part are connected to each other by a pair of arm portions. Each arm portion comprises a first extending portion and a second extending portion. The first extending portion extends longitudinally relative to the load beam from a front end of the stationary part toward the movable part. The second extending portion extends transversely inward relative to the plate portion from the first extending portion so as to be continuous with the movable part.

14 Claims, 11 Drawing Sheets

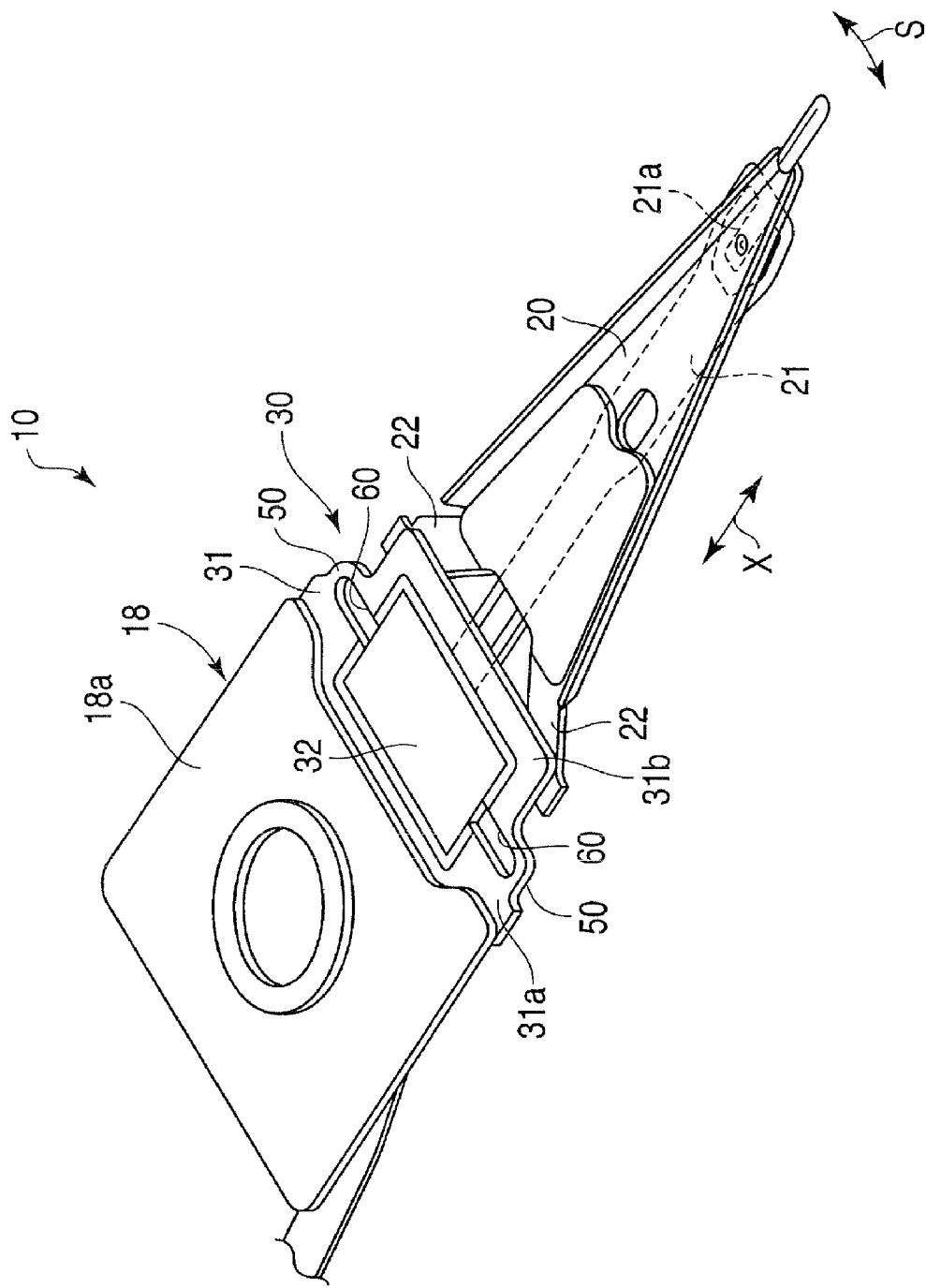
F I G. 3

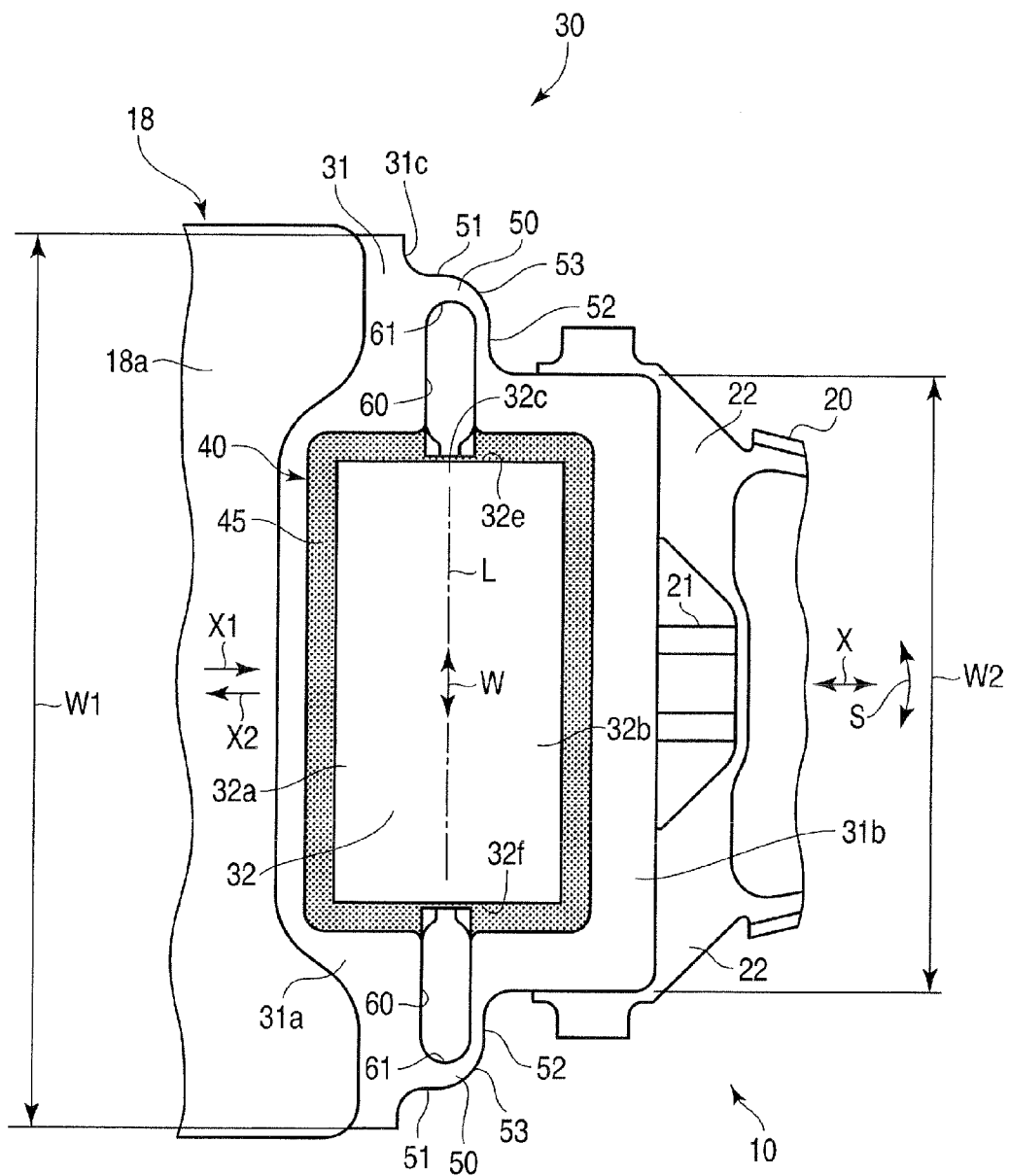
F I G. 4

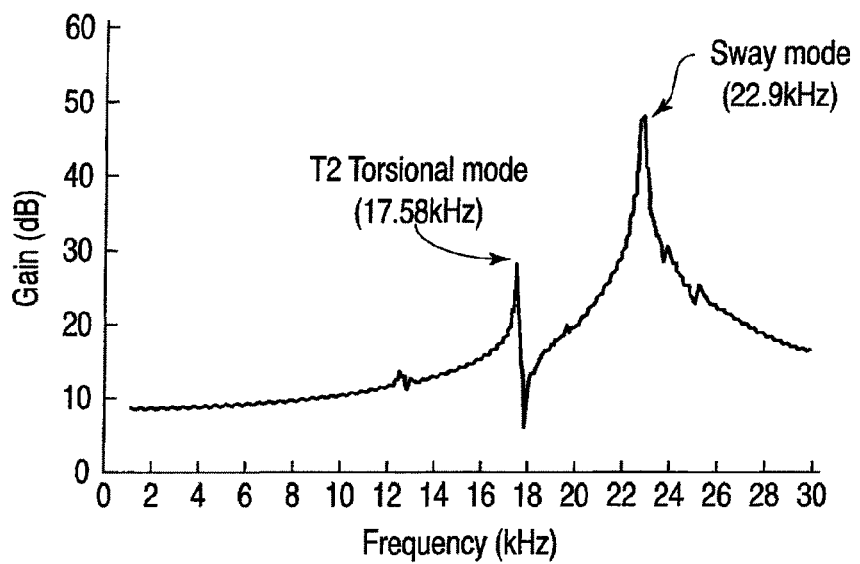
F I G. 6

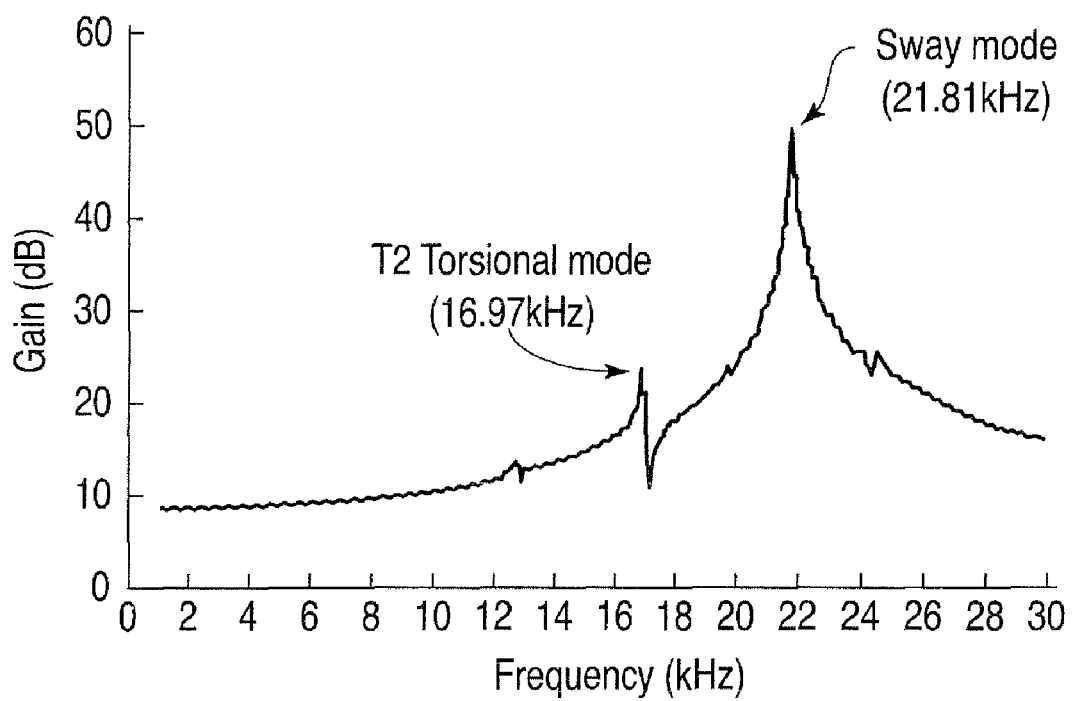
F I G. 8

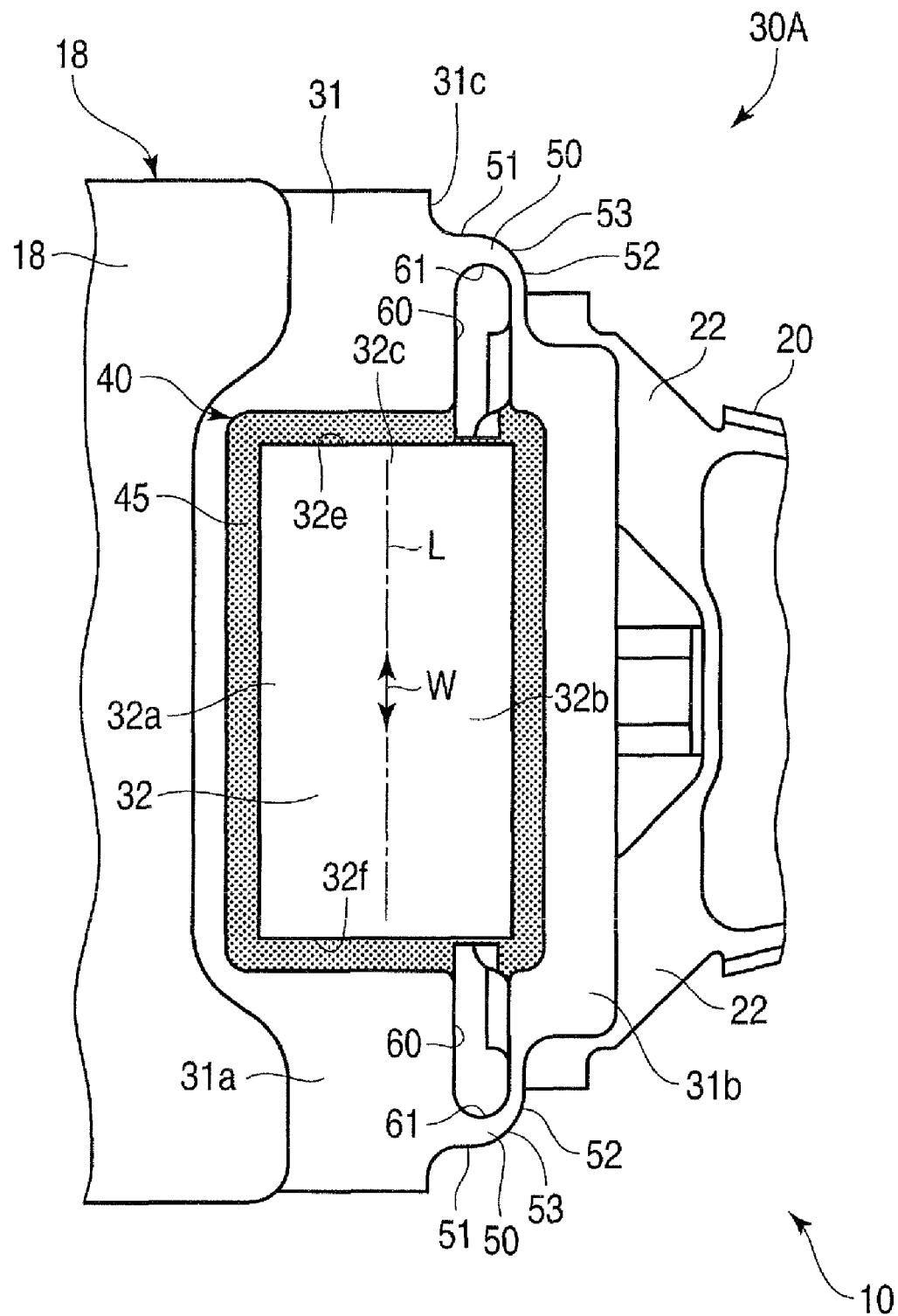
F I G. 9

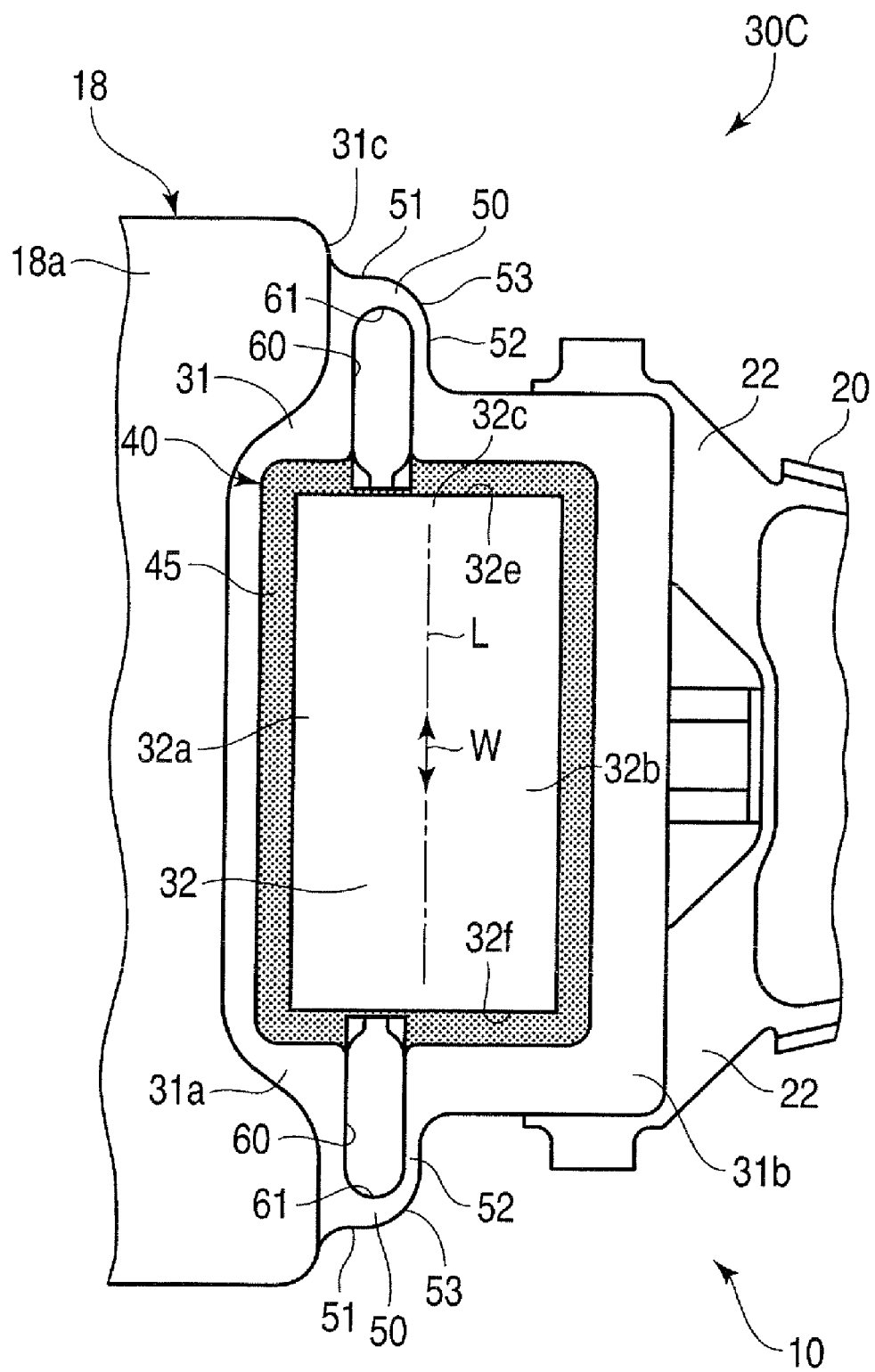
F I G. 13

DISK DRIVE SUSPENSION HAVING A MICROACTUATOR MOUNTING SECTION

CROSS-REFERENCE TO RELATED APPLICATIONS

This application is based upon and claims the benefit of priority from the prior Japanese Patent Application No. 2009-207273, filed Sep. 8, 2009, the entire contents of which are incorporated herein by reference.

BACKGROUND OF THE INVENTION

1. Field of the Invention

This invention relates to a suspension comprising a microactuator mounting section used in a disk drive for an information processing apparatus, such as a personal computer.

2. Description of the Related Art

A hard disk drive (HDD) is used in an information processing apparatus, such as a personal computer. The hard disk drive comprises a magnetic disk rotatable about a spindle, a carriage turnable about a pivot, etc. The carriage is powered by a positioning motor, such as a voice coil motor. A suspension is mounted on an arm of the carriage. The suspension comprises a load beam, a flexure superposed on the load beam, etc. A slider, which constitutes a magnetic head, is mounted on a gimbal portion formed near the distal end of the flexure. The slider is provided with elements (transducers) for accessing data, that is, for reading or writing data.

In order to overcome the increase in the recording density of disks, the magnetic head needs to be accurately positioned relative to the recording surface of each disk. To attain this, a dual-stage-actuator DSA) suspension has been developed that combines a positioning motor (voice coil motor) and microactuator. Examples of the DSA suspension are disclosed in Jpn. Pat. Appln. KOKAI Publications Nos. 2001-307442 (Patent Document 1) and 2002-50140 (Patent Document 2).

The microactuator is located near a base section of the suspension. The microactuator is formed of, for example, a piezoelectric element of lead zirconate titanate (PZT) or the like. The distal end of the suspension can be finely moved at high speed in a sway direction, that is, transversely relative to tracks by the microactuator.

Examples of a head supporting mechanism (DSA suspension) are shown in FIGS. 1 to 13 of Patent Document 1 and FIGS. 6 to 8 of Patent Document 2. A microactuator mounting section of the suspension is disposed between a mount (baseplate) and load beam. The microactuator element of PZT is disposed on the microactuator mounting section. U-shaped arm portions are formed individually on opposite sides of the microactuator mounting section. If a voltage is applied to the microactuator element, the microactuator element is deformed. Thereupon, the arm portions bend, and the magnetic-head of the suspension is displaced in the sway direction.

In the DSA suspensions disclosed in Patent Documents 1 and 2, the U-shaped arm portions project individually from the opposite sides of the microactuator mounting section. When the suspension is handled, therefore, the U-shaped arm portions may be deformed by contacting their surrounding members. Further, the DSA suspension comprising the U-shaped arm portions still needs to be improved in impact resistance and vibrational characteristics.

BRIEF SUMMARY OF THE INVENTION

This invention provides a disk drive suspension, especially a DSA suspension, with further improved impact resistance and vibrational characteristics.

A disk drive suspension according to the present invention comprises a base section secured to an arm of a carriage of a disk drive, a load beam on which a slider of a magnetic head is located, and a microactuator mounting section disposed between the base section and the load beam. The microactuator mounting section comprises a plate portion and a microactuator element. The plate portion comprises a stationary part secured to the base section and a movable part secured to the load beam. An element accommodation portion is defined between the stationary part and the movable part of the plate portion. The microactuator element is contained in the element accommodation portion. One end portion of the microactuator element is secured to the stationary part. The other end portion of the microactuator element is secured to the movable part. The plate portion comprises a pair of arm portions deformable transversely relative to the plate portion and slits. The arm portions are formed individually on opposite side portions of the plate portion and connect the stationary part and the movable part. The slits are defined individually inside the arm portions between the stationary part and the movable part. Each of the arm portions comprises a first extending portion and a second extending portion. The first extending portion extends longitudinally relative to the load beam from a front end of the stationary part toward the movable part. The second extending portion extends transversely inward relative to the plate portion from the first extending portion. The second extending portion is continuous with the movable part in a position nearer to the microactuator element than the first extending portion. The flexural rigidity of the second extending portion is lower than that of the first extending portion. The second extending portion may be narrower than the first extending portion.

In an aspect of the invention, each of the slits extends transversely relative to the plate portion from a region opposite each of opposite side surfaces of the microactuator element, and the second extending portion is formed on the front side of the slit. The slit may be formed in a position corresponding to a longitudinal central part of the microactuator element. The slit may be formed in a position nearer to the load beam than the longitudinal central part of the microactuator element.

Each of the slits may comprise a first slit portion and a second slit portion. The first slit portion extends transversely relative to the plate portion from the region opposite each of the opposite side surfaces of the microactuator element. The second slit portion extends forward relative to the plate portion so as to be continuous with the first slit portion. The slit may be formed in a position nearer to the base section than a longitudinal central part of the microactuator element.

In another aspect of the invention, each of the slits comprises a first slit portion extending transversely relative to the plate portion from a region opposite a longitudinal central part of each of the opposite side surfaces of the microactuator element and a second slit portion formed continuous with the first slit portion in a position nearer to the base section than the first slit portion.

Each of the slits may be formed to extend straight in transverse direction of the plate portion (at right angles to the longitudinal direction of the suspension). Alternatively, the slit may be formed to extend transversely relative to the plate portion at a forward or rearward angle from each side surface of the microactuator element. Further, the slits may be formed to have a curved shape as well as a straight one. The slit positions may also be varied as required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of suspension comprising a microactuator mounting section according to a first embodiment of the invention;

FIG. 4 is a plan view of the microactuator mounting section of the suspension shown in FIG. 3;

FIG. 6 is a diagram showing the frequency response characteristic of the suspension comprising the microactuator mounting section shown in FIG. 4;

FIG. 8 is a diagram showing the frequency response characteristic of the suspension comprising the microactuator mounting section shown in FIG. 7;

FIG. 9 is a plan view of a microactuator mounting section according to a second embodiment of the invention;

FIG. 13 is a plan view of a microactuator mounting section according to a fourth embodiment of the invention.

DETAILED DESCRIPTION OF THE INVENTION

A disk drive suspension according to a first embodiment of the present invention will now be described with reference to FIGS. 1 to 6.

Figure 1:
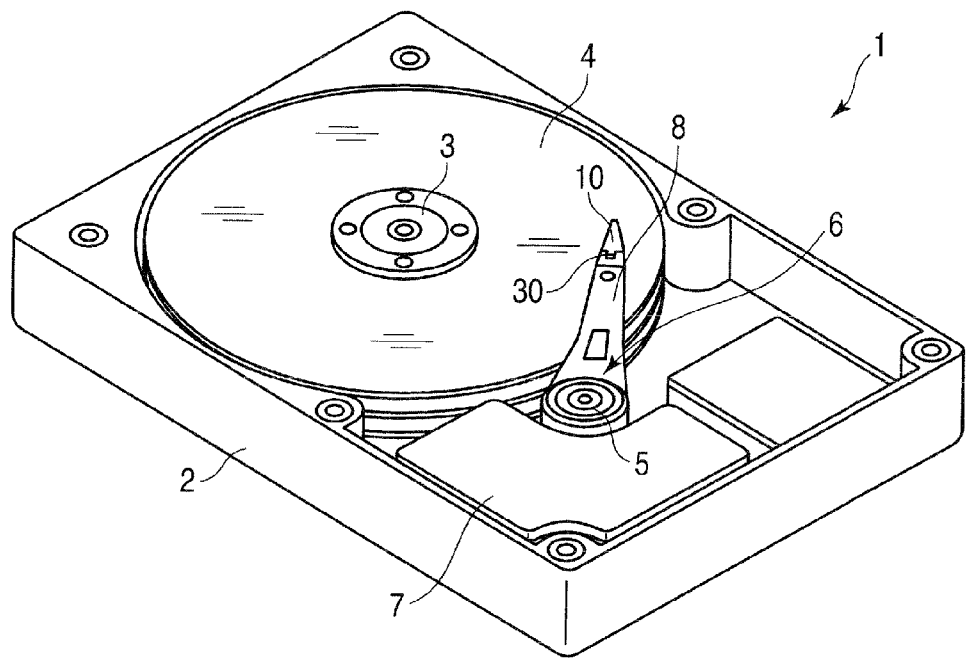
FIG. 1 is a perspective view showing an example of a disk drive.

A disk drive (HDD) 1 shown in FIG. 1 comprises a case 2, spindle 3, disks 4, pivot 5, carriage 6, positioning motor (voice coil motor) 7, etc. The disks 4 are rotatable about the spindle 3. The carriage 6 is turnable about the pivot 5. The positioning motor 7 serves to actuate the carriage 6. The case 2 is sealed by a lid (not shown).

Figure 2:
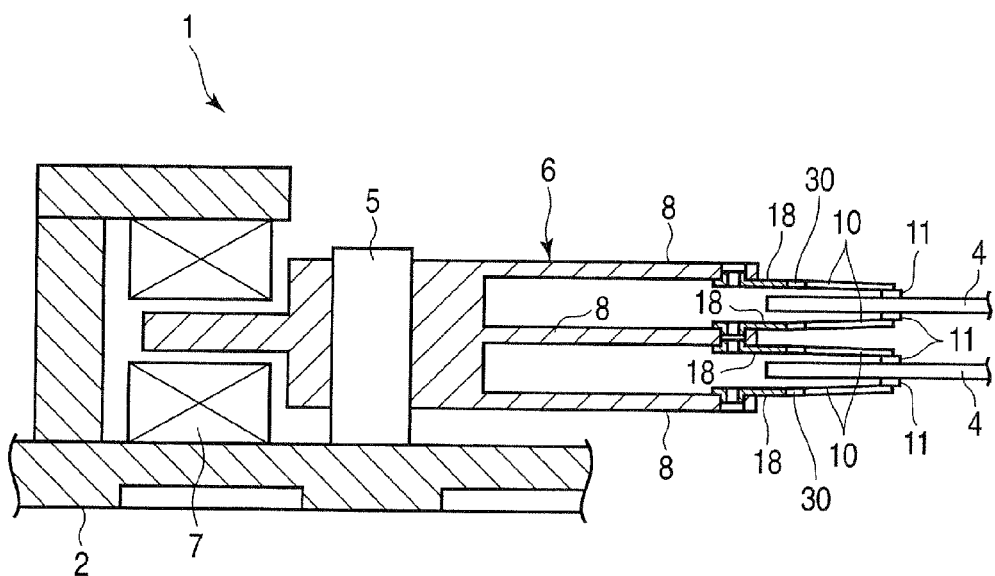
FIG. 2 is a sectional view of a part of the disk drive shown in FIG. 1.

FIG. 2 is a sectional view typically showing a part of the disk drive 1. As shown in FIG. 2, the carriage 6 comprises arms 8. A suspension 10 is mounted on the distal end portion of each arm 8. A slider 11, which constitutes a magnetic head, is disposed on the distal end portion of the suspension 10. If each disk 4 is rotated at high speed, an air bearing is formed between the disk 4 and the slider 11.

If the carriage 6 is turned by the positioning motor 7, the suspension 10 moves radially relative to the disk 4. Thereupon, the slider 11 moves to a desired track of the disk 4. Elements, such as MR elements capable of conversion between electrical and magnetic signals, are disposed on an end portion of the slider 11. These elements access that is, write or read data to or from the disk 4.

FIG. 3 shows the suspension 10 according to the first embodiment of the present invention. This suspension 10 comprises a base section 18 including a baseplate 18a, load beam 20, flexure 21 with conductors, microactuator mounting section 30, etc. The microactuator mounting section 30 will be described in detail later.

The load beam 20 is secured to its corresponding arm 8 (FIGS. 1 and 2) of the carriage 6 by the base section 18. Hinge portions 22 capable of thicknesswise elastic deformation are formed on the proximal portion (rear end portion) of the load beam 20. In FIGS. 3 and 4, arrow X indicates the longitudinal direction (front-rear direction) of the suspension 10 or that of the load beam 20, and arrow S indicates a sway direction.

The flexure 21 is located along the load beam 20. A part of the flexure 21 is secured to the load beam 20 by fixing means, such as laser welding. A tongue 21a (FIG. 3) that functions as a gimbal portion is formed near the distal end of the flexure 21. The slider 11 is mounted on the tongue 21a. The slider 11 of the magnetic head is located on the distal end portion the load beam 20. The suspension 10 and slider 11 constitute a head gimbal assembly.

FIG. 4 is an enlarged view of the microactuator mounting section 30. The microactuator mounting section 30 is located between the base section 18 and load beam 20. The microactuator mounting section 30 comprises a plate portion 31 and a microactuator element 32, such as a PZT or other piezoelectric element.

The plate portion 31 is a metallic structure of, for example, stainless steel independent of the baseplate 18a. In the present embodiment, the base section 18 is formed by superposing the baseplate 18a and plate portion 31 thicknesswise. Thus, the plate portion 31 is thinner than the base section 18. Alternatively, however, the plate portion 31 may be formed on a part of the baseplate 18a.

The plate portion 31 comprises a stationary part 31a and movable part 31b. The stationary part 31a is secured to the baseplate 18a. The movable part 31b is secured to the hinge portions 22 at the proximal portion (rear end portion) of the load beam 20. In this specification, the direction indicated by arrow X1 in FIG. 4 is described as "forward relative to the plate portion 31", and the direction indicated by arrow X2 as "rearward relative to the plate portion 31" with respect to the front-rear direction (longitudinal direction) X of the suspension 10, Arrow W indicates the transverse direction of the plate portion 31 and microactuator microactuator element 32. Width W2 of the movable part 31b of the plate portion 31 is less than width W1 of the stationary part 31a.

The plate portion 31 of the present embodiment is formed of a part independent of the baseplate 18a. In an alternative embodiment, however, the plate portion 31 may be formed by thinning a part of the baseplate 18a by press-forming or partial etching.

Figure 5:
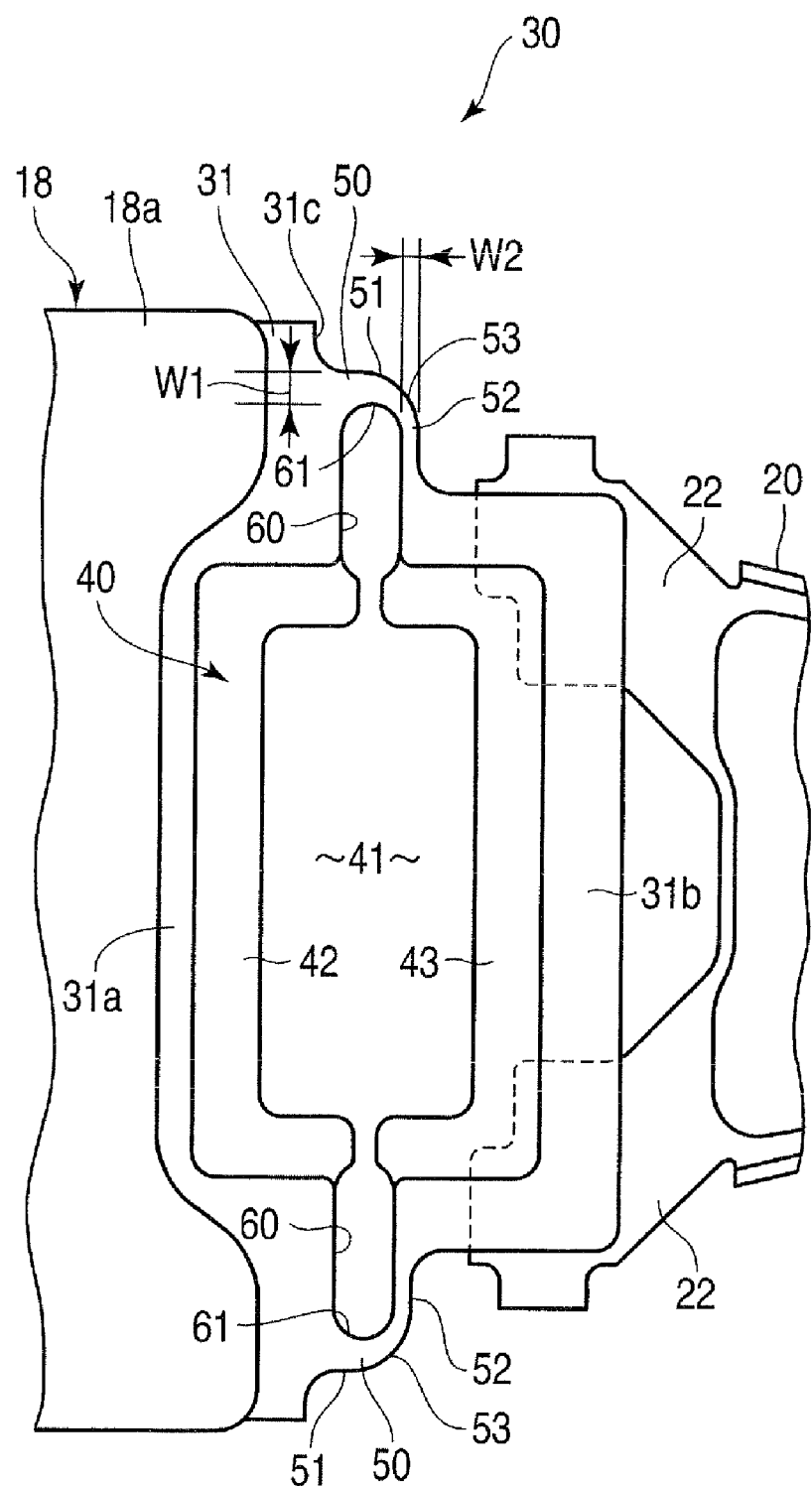
FIG. 5 is a plan view of the microactuator mounting section shown in FIG. 4 cleared of a microactuator element.

FIG. 5 shows the microactuator mounting section 30 cleared of the microactuator element 32. The plate portion 31 is formed with an element accommodation portion 40, which is a recess sufficiently large to contain the microactuator element 32. The element accommodation portion 40 is defined between the stationary part 31a and movable part 31b. The accommodation portion 40 is formed with an opening 41 smaller than the microactuator element 32. Step portions 42 and 43 are formed around the opening 41. The step portions 42 and 43 are formed on the stationary and movable parts 31a and 31*b*, respectively, of the plate portion 31. These step portions 42 and 43 are formed by partially thinning the plate portion 31 by press-farming, partial etching, or the like. The microactuator element 32 is placed on the step portions 42 and 43.

As shown in FIG. 4, one end portion 32*a* (nearer to the base section 18) of the element 32 is supported by the step portion 42 of the stationary part 31*a*. The end portion 32*a* is secured to the stationary part 31*a* by an adhesive 45. The other end portion 32*b* (nearer to the load beam 20) of the microactuator element 32 is supported by the step portion 43 of the movable part 31*b*. The end portion 32*b* is secured to the movable part 31*b* by the adhesive 45. Opposite side surfaces 32*e* and 32*f* of the microactuator element 32 are secured to the stationary and movable parts 31*a* and 31*b*, respectively, by the adhesive 45.

The microactuator element 32 is shown as rectangular in the plan view of FIG. 4. The adhesive 45 formed of an electrically insulating resin is filled and cured between the outer periphery of the microactuator element 32 and the inner periphery of the element accommodation portion 40. Thus, deformation of the microactuator element 32 caused by application of a voltage can be transmitted to the load beam 20 through the movable part 31*b*. The adhesive 45 may be doped with electrically insulating solid particles (filler).

Arm portions 50 are formed individually on the opposite side portions of the plate portion 31. Slits 60 are defined individually inside the arm portions 50 between the stationary and movable parts 31*a* and 31*b*. As shown in FIG. 5, the slits 60 communicate with the opening 41 of the element accommodation portion 40. Each slit 60 extends in the transverse direction W of the plate portion 31 from a region opposite a longitudinal central part 32*c* (region containing a center line L shown in FIG. 4) of the microactuator element 32. An end portion 61 of each slit 60 has a semicircular shape that defines the inside contour of each corresponding arm portion 50.

The stationary and movable parts 31*a* and 31*b* of the plate portion 31 are connected to each other by the arm portions 50. Since each arm portion 50 constitutes a part of the plate portion 31, it is equal to the plate portion 31 in thickness. The transverse rigidity of the arm portions 50 is sufficiently lower than the thicknesswise rigidity thereof. Therefore, the arm portions 50 can be deformed transversely relative to the plate portion 31. Thus, the movable part 31*b* can move relative to the stationary part 31*a* over a certain stroke in the sway direction (indicated by arrow S in FIGS. 3 and 4) by means of the arm portions 50.

Each arm portion 50 comprises a first extending portion 51, second extending portion 52, curved portion 53, etc. The first extending portion 51 extends in the longitudinal direction X of the load beam 20 from a front end 31*c* of the stationary part 31*a* toward the movable part 31*b*. In other words, the first extending portion 51 extends toward the front of the load beam 20 or the distal end of the suspension 10. The curved portion 53 is formed between the first and second extending portions 51 and 52. The curved portion 53 arcuately projects forward relative to the stationary part 31*a* of the plate portion 31.

The second extending portion 52 is formed in front of the first extending portion 51. In addition, the second extending portion 52 extends transversely inward relative to the plate portion 31 from the first extending portion 51 through the curved portion 53. In other words, the second extending portion 52 extends transversely relative to the plate portion 31 from the first extending portion 51 toward the opening 41. Further, the second extending portion 52 is continuous with the movable part 31*b* in a position nearer to the microactuator element 32 than the first extending portion 51. The second extending portion 52 is located on the front side of its corresponding slit 60.

Thus, the second extending portion 52 of each arm portion 50 of the microactuator mounting section 30 is located transversely inside a side surface of the stationary part 31*a* of the plate portion 31. Therefore, the second extending portion 52 does not project outward. Consequently, the second extending portion 52 cannot easily contact its surrounding members when the suspension 10 is handled, so that deformation of the arm portions 50 or other failure can be suppressed. This also applies to second to fifth embodiments, which will be described later.

As shown in FIG. 5, width W1 of the first extending portion 51 is gradually reduced toward the curved portion 53. In addition, the width of the curved portion 53 is reduced toward the second extending portion 52. Width W2 of the second extending portion 52 is less than width W1 of the first extending portion 51. Thus, each arm portion 50 has such a curved shape that its width is continuously smoothly reduced from the wider first extending portion (wide portion) 51 to the narrower second extending portion (narrow portion) 52 via the curved portion 53.

The following is a description of the action of the suspension 10 comprising the microactuator mounting section 30 constructed in this manner.

If the carriage 6 is turned by the positioning motor 7, the suspension 10 moves radially relative to the disk 4. Thereupon, the slider 11 of the magnetic head moves to a desired track of the disk 4. If voltage is applied to the microactuator element 32, moreover, the microactuator element 32 is deformed depending on the voltage level. Thereupon, the distal end of the load beam 20 finely moves in the sway direction (indicated by arrow S in FIGS. 3 and 4). Thus, the slider 11 can be accurately positioned in the sway direction.

FIG. 6 shows a frequency response characteristic curve obtained when the suspension 10 according to the first embodiment was shaken. The suspension 10 of the present embodiment exhibited a sway-mode resonant frequency of 22.90 kHz and a torsional-mode resonant frequency of 17.58 kHz, both of which are sufficiently high values for practical use. Further, the impact resistance and sway-direction stroke were 1,091 of/mm and 8.55 nm/mm, respectively.

Figure 7:
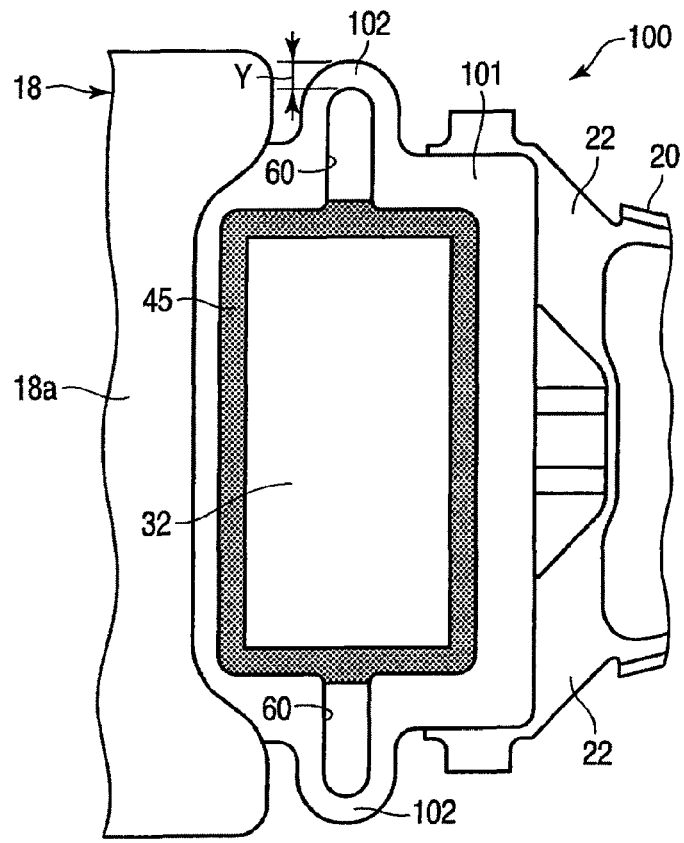
FIG. 7 is a plan view showing a microactuator according to a comparative example.

FIG. 7 shows a microactuator mounting section 100 according to a comparative example. The mounting section 100 comprises a pair of arm portions 102, each of which projects outward in a U-shape from each of opposite side surfaces of a plate portion 101. Each arm portion 102 has a longitudinally symmetrical shape. Width Y of each arm portion 102 is uniform throughout the length thereof. Other configurations are the same those of the first embodiment (FIG. 4).

FIG. 8 shows a frequency response characteristic curve obtained when a suspension comprising the microactuator mounting section 100 of the comparative example (FIG. 7) was shaken. The suspension of the comparative example exhibited a sway-mode resonant frequency of 21.81 kHz and torsional-mode resonant frequency of 16.97 kHz, both of which are lower than the val of the first embodiment and require improvement. The impact resistance and stroke of this comparative example were 1,010 gf/mm and 9.22 nm/mm, respectively.

FIG. 9 shows a microactuator mounting section 30A according to a second embodiment of the invention. Each slit 60 of this embodiment is formed in a position nearer to a load beam 20 than a longitudinal central part 32*c* of a microactuator element 32. Each slit 60 extends transversely relative to a plate portion 31 from each of opposite side surfaces 32e and 32f of the microactuator element 32. A second extending portion 52 of the arm portion 50 is formed on the front side of each slit 60. Since other configurations are common to the first and second embodiments, common numbers are used to designate common parts in FIGS. 4 and 9, and a description of those parts is omitted. A suspension comprising the microactuator mounting section 30A of the present embodiment exhibited an impact resistance of 1,480 gf/mm, vibrational characteristic (sway frequency) of 23.26 kHz, and stroke of 7.22 nm/nm.

Figure 10:
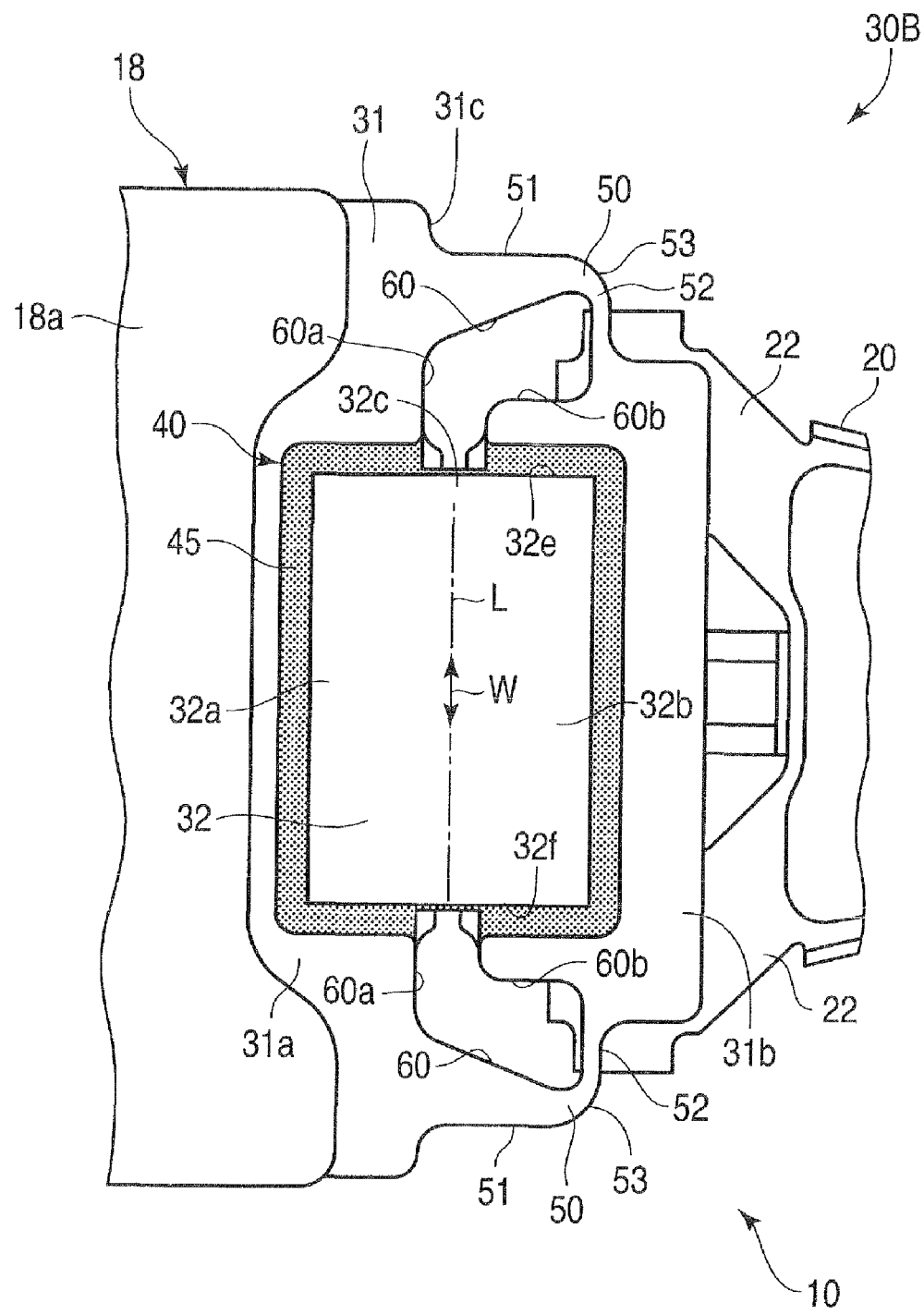
FIG. 10 is a plan view of a microactuator mounting section according to a third embodiment of the invention.

FIG. 10 shows a microactuator mounting section 30B according to a third embodiment of the invention. Each slit 60 of this embodiment comprises first and second slit portions 60a and 60b. The first slit portion 60a extends transversely relative to a plate portion 31 from a region opposite a longitudinal central part of each of opposite side surfaces 32e and 32f of a microactuator element 32. The second slit portion 60b extends forward relative to the plate portion 31 so as to be continuous with the first slit portion 60a. A second extending portion 52 of an arm portion 50 is formed in front of the second slit portion 60b. Since other configurations are common to the first and third embodiments, common numbers are used to designate common parts in FIGS. 4 and 10, and a description of those parts is omitted. A suspension comprising the microactuator mounting section 30B of the present embodiment exhibited an impact resistance of 1,372 gf/mm, vibrational characteristic (sway frequency) of 22.42 kHz, and stroke of 8.19 nm/mm.

Figure 11:
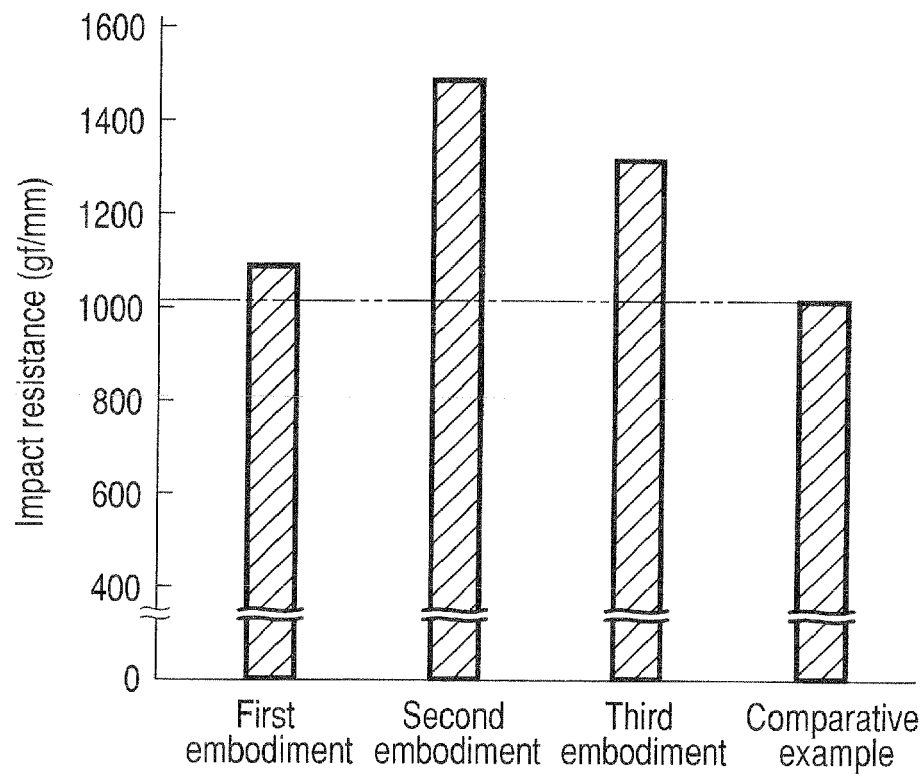
FIG. 11 is a diagram showing impact resistance characteristics of the first to third embodiments and the comparative example.
Figure 12:
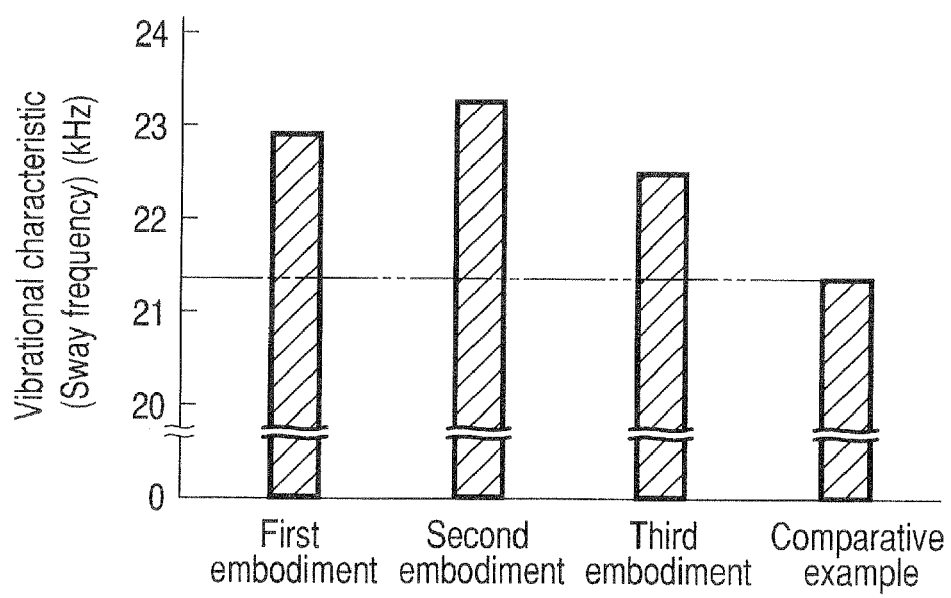
FIG. 12 is a diagram showing vibrational characteristics (sway frequencies) of the first to third embodiments and the comparative example.

FIG. 11 shows impact resistance characteristics of the suspensions of the first to third embodiments and the comparative example. Since the first to third embodiments are higher in impact resistance than the comparative example, they are less susceptible to external vibration. FIG. 12 shows vibrational characteristics (sway frequencies) of the first to third embodiments and the comparative example. The sway frequencies of the first to third embodiments can be made higher than that of the comparative example, so that resonance cannot be easily caused. The microactuator mounting sections 30, 30A and 30B of the first to third embodiments were able to ensure practicable sway-direction strokes.

FIG. 13 shows a microactuator mounting section 30C according to a fourth embodiment of the invention. Each slit 60 of this embodiment is formed in a position nearer to a base section 18 than a longitudinal central part 32c of a microactuator element 32. Since other configurations are common to the first and fourth embodiments, common numbers are used to designate common parts in FIGS. 4 and 13, and a description of those parts is omitted. Each slit 60 extends transversely relative to a plate portion 31 from each of opposite side surfaces 32e and 32f of the microactuator element 32. A second extending portion 52 of an arm portion 50 is formed in front of the slit 60. The microactuator mounting section 30C of this embodiment was also able to ensure a practicable sway-direction stroke and exhibited good impact resistance and vibrational characteristics.

Figure 14:
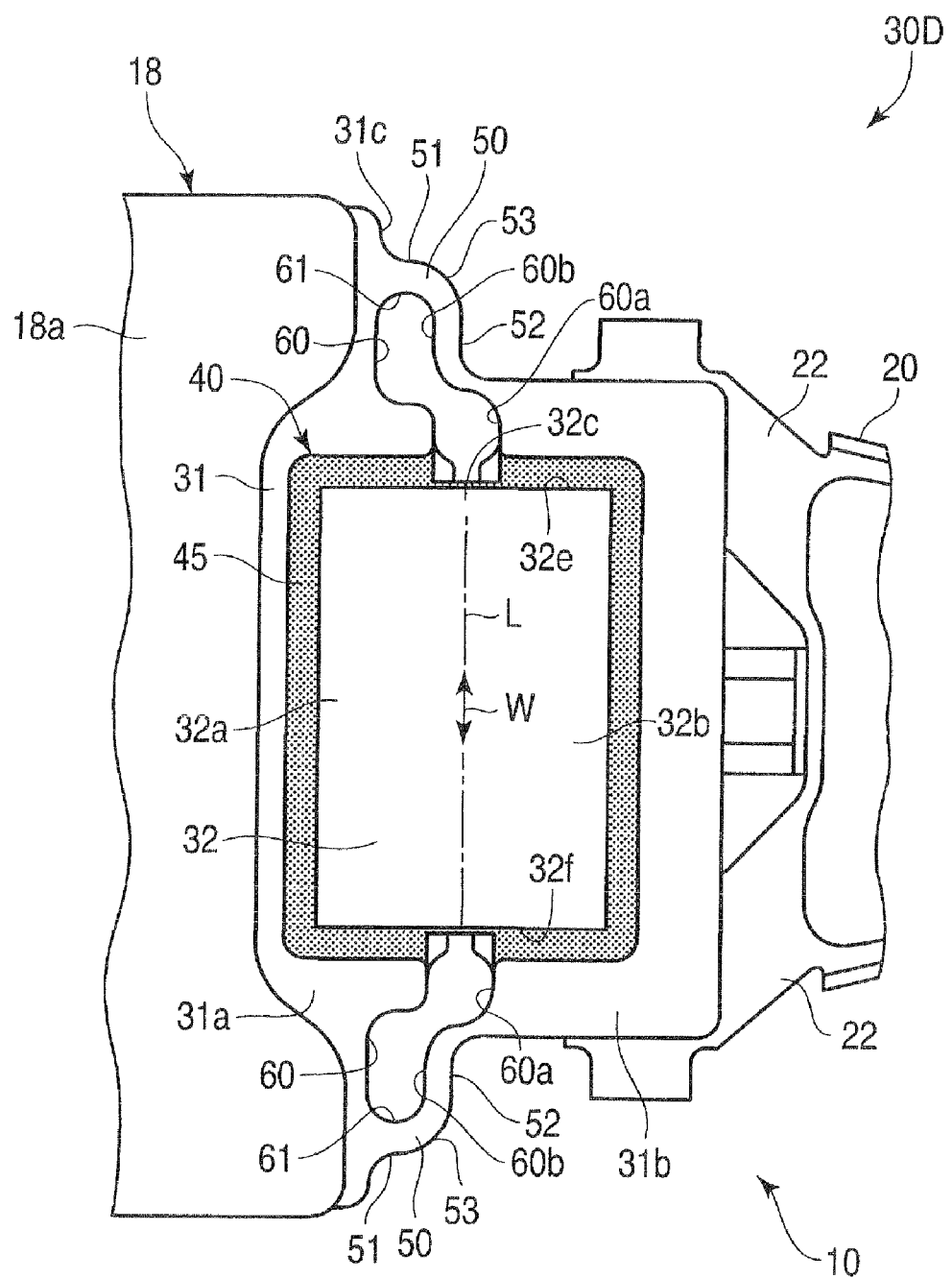
FIG. 14 is a plan view of a microactuator mounting section according to a fifth embodiment of the invention.

FIG. 14 shows a microactuator mounting section 30D according to a fifth embodiment of the invention. Each slit 60 of this embodiment comprises first and second slit portions 60a and 60b. The first slit portion 60a extends transversely relative to a plate portion 31 from a region opposite a longitudinal central part 32c of each of opposite side surfaces 32e and 32f of a microactuator element 32. The second slit portion 60b is formed continuous with the first slit portion 60a in a position nearer to a base section 18 than the first slit portion 60a. A second extending portion 52 of an arm portion 50 is formed in front of the second slit portion 60b. Since other configurations are common to the first and fifth embodiments, common numbers are used to designate common parts in FIGS. 4 and 14, and a description of those parts is omitted. The microactuator mounting section 30D of this embodiment was also able to ensure a practicable stroke and exhibited good impact resistance and vibrational characteristics.

According to each of the embodiments described herein, the disk drive suspension comprising the microactuator mounting section can be further improved in impact resistance and vibrational characteristics without failing to ensure a sway-direction stroke. Furthermore, each arm portion of the microactuator mounting section is located transversely inside the side surface of the stationary part of the plate portion, so that the first and second extending portions of the arm portion do not project outward. Consequently, the arm portions cannot easily contact their surrounding members when the suspension is handled, so that deformation of the arm portions or other failure can be suppressed.

It is to be understood, in carrying out the present invention, that the shapes, materials, layouts, etc., of the plate portion, microactuator element, arm portions, etc., which constitute the microactuator mounting section, as well as the base section and load beam, which constitute each suspension, may be embodied in various forms. For example, a pair of microactuator elements may be located parallel to each other transversely relative to the plate portion. Further, the first and second extending portions may be equal in width. Each slit may be formed to extend transversely relative to the microactuator mounting section at a forward or rearward angle from each side surface of the microactuator element. Furthermore, the slits are not limited to a straight shape and may be bent in the middle. The slit positions may also be varied as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
a base section secured to an arm of a carriage of a disk drive;
a load beam on which a slider of a magnetic head is located; and
a microactuator mounting section disposed between the base section and the load beam,
the microactuator mounting section comprising
a plate portion comprising a stationary part secured to the base section and a movable part secured to the load beam, and
a microactuator element contained in an element accommodation portion defined between the stationary part and the movable part of the plate portion,
one end portion of the microactuator element being secured to the stationary part,
the other end portion of the microactuator element being secured to the movable part,
the plate portion comprising
a pair of arm portions formed individually on opposite side portions of the plate portion, connecting the stationary part and the movable part, and deformable transversely relative to the plate portion, and
slits defined individually inside the arm portions between the stationary part and the movable part, each said arm portion comprising
a first extending portion extending longitudinally relative to the load beam from a front end of the stationary part of the plate portion toward the movable part, and
a second extending portion extending transversely inward relative to the plate portion from the first extending portion so as to be continuous with the movable part in a position nearer to the microactuator element than the first extending portion.

2. The disk drive suspension according to claim 1, wherein a width of the second extending portion is less than a width of the first extending portion.

3. The disk drive suspension according to claim 1, wherein each said slit of the microactuator mounting section extends transversely relative to the plate portion from a region opposite each of opposite side surfaces of the microactuator element, and the second extending portion is formed on the front side of the slit.

4. The disk drive suspension according to claim 2, wherein each said slit of the microactuator mounting section extends transversely relative to the plate portion from a region opposite each of opposite side surfaces of the microactuator element, and the second extending portion is formed on the front side of the slit.

5. The disk drive suspension according to claim 3, wherein each said slit of the microactuator mounting section is formed in a position corresponding to a longitudinal central part of the microactuator element.

6. The disk drive suspension according to claim 4, wherein each said slit of the microactuator mounting section is formed in a position corresponding to a longitudinal central part of the microactuator element.

7. The disk drive suspension according to claim 3, wherein each said slit of the microactuator mounting section is formed in a position nearer to the load beam than a longitudinal central part of the microactuator element.

8. The disk drive suspension according to claim 4, wherein each said slit of the microactuator mounting section is formed in a position nearer to the load beam than a longitudinal central part of the microactuator element.

9. The disk drive suspension according to claim 3, wherein each said slit of the microactuator mounting section comprises a first slit portion extending transversely relative to the plate portion from the region opposite each of the opposite side surfaces of the microactuator element and a second slit portion extending forward relative to the plate portion so as to be continuous with the first slit portion.

10. The disk drive suspension according to claim 4, wherein each said slit of the microactuator mounting section comprises a first slit portion extending transversely relative to the plate portion from the region opposite each of the opposite side surfaces of the microactuator element and a second slit portion extending forward relative to the plate portion so as to be continuous with the first slit portion.

11. The disk drive suspension according to claim 3, wherein each said slit of the microactuator mounting section is formed in a position nearer to the base section than a longitudinal central part of the microactuator element.

12. The disk drive suspension according to claim 4, wherein each said slit of the microactuator mounting section is formed in a position nearer to the base section than a longitudinal central part of the microactuator element.

13. The disk drive suspension according to claim 3, wherein each said slit of the microactuator mounting section comprises a first slit portion extending transversely relative to the plate portion from a region opposite a longitudinal central part of each of the opposite side surfaces of the microactuator element and a second slit portion formed continuous with the first slit portion in a position nearer to the base section than the first slit portion.

14. The disk drive suspension according to claim 4, wherein each said slit of the microactuator mounting section comprises a first slit portion extending transversely relative to the plate portion from a region opposite a longitudinal central part of each of the opposite side surfaces of the microactuator element and a second slit portion formed continuous with the first slit portion in a position nearer to the base section than the first slit portion.

* * * * *